(12) United States Patent
Adams

(10) Patent No.: US 6,654,391 B2
(45) Date of Patent: Nov. 25, 2003

(54) METHOD FOR OPERATING Q-SWITCHED LASERS WITH INTRACAVITY FREQUENCY CONVERSION

(75) Inventor: Frank Adams, Los Altos, CA (US)

(73) Assignee: Lightwave Electronics, Mountain View, CA (US)

( * ) Notice: Subject to any disclaimer, the term of this patent is extended or adjusted under 35 U.S.C. 154(b) by 78 days.

(21) Appl. No.: 09/823,908

(22) Filed: Mar. 30, 2001

(65) Prior Publication Data

US 2002/0141457 A1 Oct. 3, 2002

(51) Int. Cl.[7] .............................. H01S 3/10; H01S 3/11; H01S 3/13
(52) U.S. Cl. ............................ 372/10; 372/12; 372/13; 372/25; 372/29.021; 372/30; 372/70
(58) Field of Search ............................... 372/10, 11, 12, 372/13, 21, 22, 25, 29.02, 30, 38.02, 14, 29.021, 15, 16, 70

(56) References Cited

U.S. PATENT DOCUMENTS 5,812,569 A * 9/1998 Walker et al. ................. 372/30
6,009,110 A * 12/1999 Wiechmann et al. ......... 372/10
6,418,154 B1 * 7/2002 Kneip et al. .................. 372/25

OTHER PUBLICATIONS

Orazio Svelto, "Principles of Laser Optics," Plenum Press, (translated by David C. Hanna), 1998, pp. 313–319.
William G. Wagner, et al., "Evolution of a Giant Laser Pulse," Journal of Applied Physics, vol. 34, No. 7, 1963, pp. 2040–2045.
Walter Koechner, "Laser Engineering," Springer Series in Optical Sciences, vol. 1, Springer–Verlag, Berlin Heidelberg, 4th Edition (1996) Chapter 8.

* cited by examiner

Primary Examiner—Eddie Lee
Assistant Examiner—Matthew C Landau
(74) Attorney, Agent, or Firm—Lumen Intellectual Property Services, Inc.

(57) ABSTRACT

An intracavity frequency converted, Q-switched laser and method for operating such laser to obtain high output power in secondary pulses at a converted frequency. The secondary pulses are generated by a intracavity frequency conversion element from primary pulses at the fundamental wavelength. In accordance with the invention, after the primary and secondary pulses are generated the Q-switch is turned back on before the gain is fully depleted in the generation of the primary pulse. In particular, the Q-switch is turned back on such that a certain amount of energy of the primary pulse is retained in the laser, but late enough so that a majority of the secondary pulse is out-coupled from the laser. The Q-switched laser is well-suited for use at pulse repetition rates larger than $1/\tau$, where $\tau$ is an upper state lifetime (fluorescence lifetime) of the laser. Specifically, the laser can be operated at repetition rates of 10 kHz and higher, e.g., 30 kHz and higher to obtain significant increases in output power of the secondary pulses. Furthermore, the method and laser of the invention are compatible with various types of frequency conversion elements and processes including second harmonic generation, third harmonic generation, fourth harmonic generation, difference frequency generation, sum frequency generation, parametric amplification and parametric generation.

22 Claims, 4 Drawing Sheets

US 6,654,391 B2

METHOD FOR OPERATING Q-SWITCHED LASERS WITH INTRACAVITY FREQUENCY CONVERSION

FIELD OF THE INVENTION

The present invention relates generally to Q-switched lasers, and in particular to Q-switched lasers with frequency conversion in the laser cavity, and more particularly to methods for operating such lasers.

BACKGROUND OF THE INVENTION

The application of Q-switching techniques to lasers has made it possible to produce short pulses with high peak-powers. Many standard Q-switched lasers are capable of producing pulses with a duration on the order of a few cavity decay times (i.e., from a few nanoseconds to many tens of nanoseconds) and peak powers from the kilowatt to the megawatt range.

In lasers without Q-switches and in which the lasing medium is continuously pumped, the population inversion (i.e., the proportion of lasant atoms or molecules in the high energy state and ready to participate in stimulated emission) is fixed at a threshold value when oscillation is steady. Even under pulsed operating conditions, particularly at high repetition rates, the population inversion exceeds the threshold value by only a relatively small amount due to the onset of stimulated emission. Q-switching techniques employ a Q-switch positioned inside the laser cavity to modulate the laser cavity loss. When the Q-switch is on cavity loss is very high and laser action is prevented. Consequently, as the lasing medium is pumped the population inversion builds up to levels far exceeding the threshold population holding when the Q-switch is absent. Now, when the Q-switch is suddenly turned off, the cavity loss decreases rapidly and the laser suddenly has a gain that greatly exceeds loss. As a result, the energy stored in the lasing medium is released in the form of a short and intense pulse.

Various types of Q-switches employing different principles have been described in the prior art. In general, these Q-switches fall into two groups: active Q-switches and passive Q-switches. Active Q-switches require external control to turn them on and off. For the most part, active Q-switches either employ mechanical elements (e.g., mechanical shutters, rotating prisms, etc.) or elements relying on the electro-optic or acousto-optic effects. Passive Q-switches typically rely on an optical nonlinearity of the element used (e.g., a saturable absorber). For more information on Q-switches the reader is referred to Orazio Svelto, "Principles of Laser Optics", Plenum Press, (translated by David C. Hanna), 1998, pp. 313–319.

FIG. 1 shows a typical prior art Q-switched laser 10 with an active Q-switch 12 controlled by a Q-switch control 14. A lasing medium 16 of laser 10 is pumped by a pump source 18 such as a bank of laser diodes, a source of pump light or any other suitable pumping mechanism. Pump source 18 is controlled by a pump control 20 to pump lasing medium 16 continuously or nearly-continuously and to thus achieve a population inversion among atoms 30 of medium 16. In other words, pump source 18 ensures that there is a large number of "pumped" atoms 30A indicated by full circles (i.e., atoms 30A are in an upper energy state). Atoms 30A are ready to emit light 28 when stimulated. Laser 10 has a cavity 22 defined between a high reflector 24 and an output coupler 26.

When Q-switch 12 is in the on state it prevents light 28 emitted by atoms 30A of lasing medium 16 from setting up resonant modes between mirrors 24 and 26 of cavity 22 (e.g., by deflecting light 28 out of cavity 22). Hence, loss in cavity 22 is high and no output light 28 is coupled out through output coupler 26. As Q-switch 12 is turned off, the loss in cavity 22 decreases and once it equals the gain (first intersection), stimulated emission takes place, as shown in FIG. 2A. More specifically, as loss $\gamma(t)$ drops below gain $g(t)$ laser 10 starts to build up and light 28 is out-coupled through output coupler 26 (see FIG. 1) in the form of a pulse 32. The peak of pulse 32 generally coincides with the time at which gain $g(t)$ and loss $\gamma(t)$ are once again equal (second intersection). After that, pulse 32 decays along with decreasing gain $g(t)$.

Typically, Q-switched laser 10 is operated to produce a number of pulses 32 at a certain repetition rate, as shown in FIG. 2B. This repetition rate is shown as fixed, but it may also vary with time. For that purpose, pump source 18 is set up to continuously pump medium 16 at a constant pump rate $R_p$. Meanwhile, loss $\gamma(t)$ is periodically modulated by Q-switch control 14, which opens and closes Q-switch 12 very rapidly. Thus, loss $\gamma(t)$ changes between a low level (Q-switch 12 off) and a high level (Q-switch 12 on). In response, lasing medium 16 generates photons $\phi(t)$ of light 28 in pulses 32, as shown. The population of atoms 30A in the upper state is at a high or initial level $N_i$ before each pulse 32. A number of photons $\phi(t)$ of light 28 are emitted as a function of time from atoms 30A during pulse 32. The population of atoms 30A in the upper state reaches a low or final level $N_f$ after each pulse 32. Once pulse 32 is completely out-coupled from cavity 22, Q-switch control 14 waits and then turns Q-switch 12 back on to build up the population of atoms 30A to the initial level $N_i$ in preparation for subsequent pulse 32.

After each pulse 32 gain $g(t)$ is depleted well below the lasing threshold and remains there for a substantial amount of time even while being pumped by pump source 18 in preparation for subsequent pulse 32. In fact, when laser 10 is continuously pumped at rate $R_p$, as shown in FIG. 2B, gain $g(t)$ is below threshold without the aid of Q-switch 12 being turned on for a duration after pulse 32 that is significant. At high repetition rates this duration is a substantial percentage (5 to 50%) of the interpulse time $\tau_p$. When laser 10 operates at low repetition rates this duration is a substantial percentage (5 to 50%) of the lasing medium's 16 fluorescence lifetime ($\tau$) (the lifetime of atoms 30A in the upper state).

Given this situation, the prior art teaches that Q-switch 12 should be turned on after all the useful energy of pulse 32 is extracted from cavity 22, which sets a minimum time, but before laser 10 reaches the lasing threshold and again emits, which sets a maximum time. Avoiding this later emission ensures that no energy is taken away from the desired subsequent pulse 32. Consequently, the exact time when Q-switch 12 is turned back on after pulse 32 can be any time before laser 10 reaches the lasing threshold. In practice, it does not matter if this time is longer or shorter, as long as it is neither too short, so it does not interfere with the out-coupling of pulse 32, nor too long, so it does not fail to store energy for next pulse 32. Thus, Q-switch 12 is set to turn on after a "safe" intermediate time to ensure stable operation. The prior art also notes, that setting Q-switch 12 to be turned on right after pulse 32 produces instabilities in power levels of subsequent pulses 32, fluctuations in build-up times, as well as artifacts (e.g., secondary emissions). For further theory of operating Q-switched lasers the reader is referred to William G. Wagner et al., "Evolution of a Giant Laser Pulse", Journal of Applied Physics, Vol. 34, No. 7, 1963, pp. 2040–5 as well as Walter Koechner, "Laser Engineering", Springer Series in Optical Sciences, Vol. 1, Springer-Verlag, Berlin Heidelberg, 4th edition (1996), Chapter 8, and Orazio Svelto, op. cit.

Due to the above-mentioned intricacies as well as other considerations, most Q-switched lasers are operated at their fundamental frequency within the "safe" regime. Thus, for reasons that will be explained by the invention, most Q-switched lasers are not fully optimized for practical applications where intracavity frequency conversion is required. In other words, most Q-switched lasers are not well-adapted to have frequency conversion elements (e.g., nonlinear optical materials for frequency doubling) positioned inside the laser cavity for converting the fundamental frequency to another desired frequency.

It would be an advance in the art to improve the efficiency of stable Q-switched lasers which take advantage of intracavity frequency conversion.

OBJECTS AND ADVANTAGES

In view of the above, it is a primary object of the present invention to provide a method for operating Q-switched lasers with intracavity frequency conversion. Specifically, it is an object of the invention to provide a method for timing the turning on and turning off of the Q-switch to ensure efficient and high power operation of such intracavity frequency converted lasers.

It is another object of the invention to provide effective guidelines for determining the timing for turning the Q-switch on and off.

Yet another object of the invention is to provide a Q-switched laser with intracavity frequency conversion adapted for open and closed-loop operation.

These and numerous other advantages of the present invention will become apparent upon reading the detailed description.

SUMMARY

The present invention provides a method for operating a laser which has a Q-switch and also performs intracavity frequency conversion. The intracavity conversion is performed by one or more intracavity frequency conversion elements provided in the laser cavity for converting the fundamental frequency of the laser to a desired, converted frequency. The method calls for turning off the Q-switch to deplete a gain of the laser and thereby generate a primary pulse at the fundamental frequency and, through frequency conversion of the primary pulse in the intracavity frequency conversion element or elements, a secondary pulse at the converted frequency. The Q-switch is then turned back on before the gain is fully depleted in the generation of the primary pulse. In particular, the Q-switch is turned back on such that a certain amount of energy of the primary pulse is retained in the laser. Preferably, the amount of energy of the primary pulse which is retained in the laser, i.e., is not out-coupled from the laser, is at least 1% of the primary pulse. At the same time, it is preferable that the Q-switch be turned on after a majority of the secondary pulse is out-coupled from the laser. This majority is preferably selected or adjusted such that the laser retains a certain pulse-to-pulse stability in said secondary pulse. In other words, a subsequent secondary pulse following the secondary pulse being out-coupled should exhibit substantially the same parameters, e.g., peak power or energy as its predecessor.

The Q-switched laser is well-suited for use at pulse repetition rates larger than $1/\tau$, where $\tau$ is an upper state lifetime of the laser. Specifically, a Nd:YAG laser, as an example, can be operated at repetition rates of 10 kHz and higher, e.g., 30 kHz and higher.

The method of the invention can be applied in conjunction with various types of frequency conversion elements. For example, the frequency conversion element can be a non-linear optical material which performs a frequency mixing operation. Such operations can include second harmonic generation, third harmonic generation, fourth and higher harmonic generation, difference frequency generation, sum frequency generation, parametric amplification and parametric generation.

In some embodiments the laser can be pumped continuously (cw pumping) at a certain pump rate $R_p$. In other embodiments the laser can be pumped nearly continuously.

In yet another embodiment of the method, the Q-switch of the laser with intracavity frequency conversion is turned back on after a majority of the secondary pulse is out-coupled from the laser and a certain portion of the primary pulse is retained in the laser. Again, this majority is preferably selected or adjusted such that the laser retains a certain pulse-to-pulse stability in said secondary pulse. Meanwhile, at least 1% of the primary pulse should be retained.

In still another embodiment of the method, the Q-switch is turned on and off repetitively to generate a train of primary and secondary pulses at the fundamental and converted frequencies respectively. After a majority of the secondary pulse is out-coupled, the Q-switch is turned back on for a majority of the train's interpulse time $\tau_p$, which is the time between subsequent pairs of primary and secondary pulses. In particular, the Q-switch is turned on for more than 95% of the interpulse time $\tau_p$. In addition, the Q-switch is also adjusted so that a certain portion, e.g., at least 1% of each of the primary pulses is retained in the laser.

A Q-switched laser with intracavity frequency conversion in accordance with the invention is equipped with the appropriate Q-switch, such as an active Q-switch, and a control for turning the Q-switch on and off. The laser also has a monitoring unit for monitoring the power of secondary pulses at the converted frequency. The Q-switch control is set for turning off and turning on the Q-switch such that the power of the secondary pulses is maximized. This can be accomplished by providing a closed loop feedback from the monitoring unit to the Q-switch control. Alternatively, the adjustment can be performed in open loop operation, e.g., during an initial calibration of the laser.

The laser can be a cw pumped or nearly cw pumped laser and can be equipped with any suitable active Q-switch. For example, the Q-switch can be selected from among acousto-optic Q-switches and electro-optic Q-switches.

A detailed description of the invention and the preferred and alternative embodiments is presented below in reference to the attached drawing figures.

DETAILED DESCRIPTION

Figure 3:
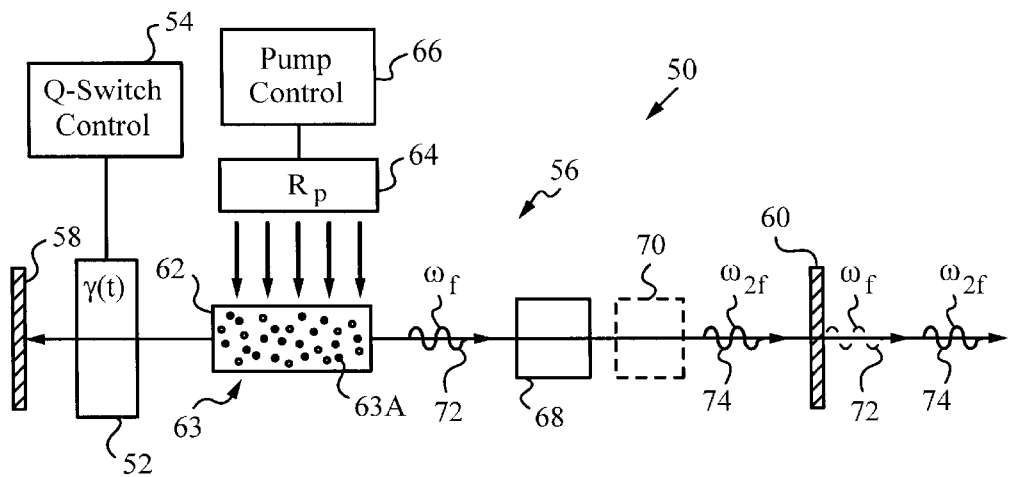
FIG. 3 is a schematic of a Q-switched laser with intracavity frequency conversion in accordance with the invention.

FIG. 3 illustrates a Q-switched laser 50 equipped with a Q-switch 52. Q-switch 52 is an active Q-switch such as an acousto-optic or electro-optic switch. A Q-switch control 54 connected to Q-switch 52 controls the turning on and turning off of Q-switch 52.

Laser 50 has a cavity 56 set up between a high reflector or mirror 58 and an output coupling means 60, in this case an output coupling element in the form of an output mirror. Lasing cavity 56 permits light to set up lasing modes within it. It is understood that although cavity 56 is a linear cavity, any other type of cavity can be used by laser 50. Moreover, output coupling means other than mirrors can be used, including, but not limited to, prisms, gratings or frequency-selective coatings.

A lasing medium 62 is positioned inside cavity 56 and a pump source 64 is provided for pumping lasing medium 62. Lasing medium 62 has atoms or molecules 63 with appropriate energy levels, such that they can be pumped into an upper state from which they decay and emit light. That decay is characterized by a lifetime $\tau$, also known as the fluorescence lifetime. A pump control 66 controls pump source 64 and determines the pumping mode, e.g., cw or nearly-cw, and the pump rate $R_p$. In the present embodiment pump control 66 is set for cw-pumping.

Laser 50 has a frequency conversion element 68 positioned intracavity or inside cavity 56. Preferably, element 68 is a suitable nonlinear optical material capable of performing a frequency mixing operation on incident light. For example, element 68 is selected to have a nonlinear susceptibility for performing optical frequency mixing operations such as parametric generation, parametric amplification or second harmonic generation. Materials which can be used in optical element 68 can be selected from among lithium niobate, lithium tantalate, MgO:LiNbO$_3$, Zn:LiNbO$_3$, MgO:LiTaO$_3$, stoichiometric lithium niobate, stoichiometric lithium tantalate, potassium niobate, LBO, BBO, CLBO, KTP, isomorphs of KTP, such as KTA, RTA and other materials. A person skilled in the art will realize that numerous other materials and groups of materials exhibiting suitably large nonlinear susceptibility and other desirable characteristics are available and can be used in element 68.

Depending on the application of laser 50, additional frequency conversion elements can be positioned inside cavity 56. For example, another element 70 indicated in dashed lines and exhibiting nonlinear susceptibility can be positioned inside cavity 56 for performing additional frequency mixing operations such as third harmonic generation. In fact, additional frequency conversion elements can be positioned within cavity 56 and generate any desired higher order harmonic or harmonics, e.g., the fourth harmonic. In the present embodiment only element 68 is present and it is a lithium niobate crystal for performing second harmonic generation. A person skilled in the art will also realize that element 68 may further include appropriate measures for ensuring high efficiency of second harmonic generation, e.g., a phase matching scheme such as a quasi-phase-matching grating, an angle-tuning arrangement or a temperature-tuning arrangement.

During operation lasing medium 62 is pumped continuously by pump source 64 at a pump rate $R_p$. The pumping promotes a large number of atoms 63 to the upper energy state. The upper energy state atoms are indicated by filled in circles and reference 63A.

Figure 1:
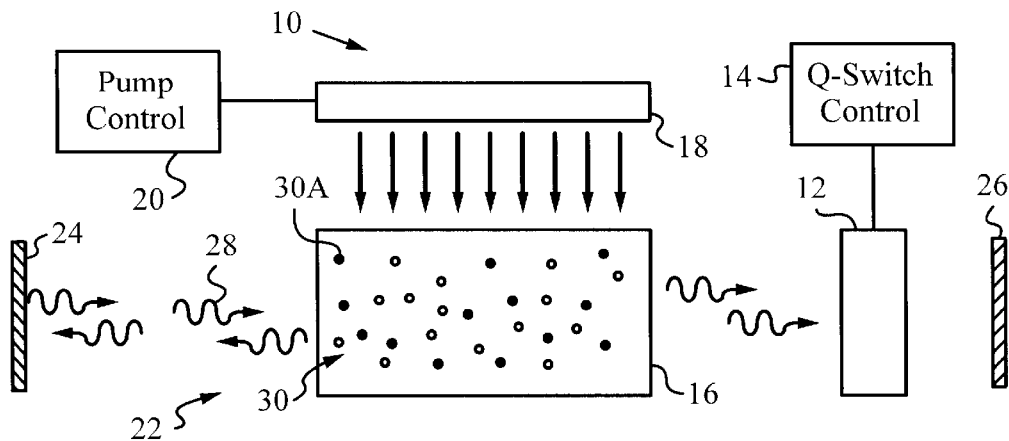
FIG. 1 (Prior art) is a general schematic view of a typical Q-switched laser.
Figure 2A:
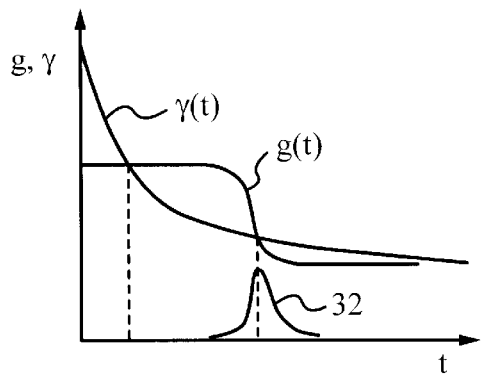
FIG. 2A (Prior art) is a graph illustrating the relationship between gain, loss and pulse timing in the Q-switched laser of FIG. 1.
Figure 2B:
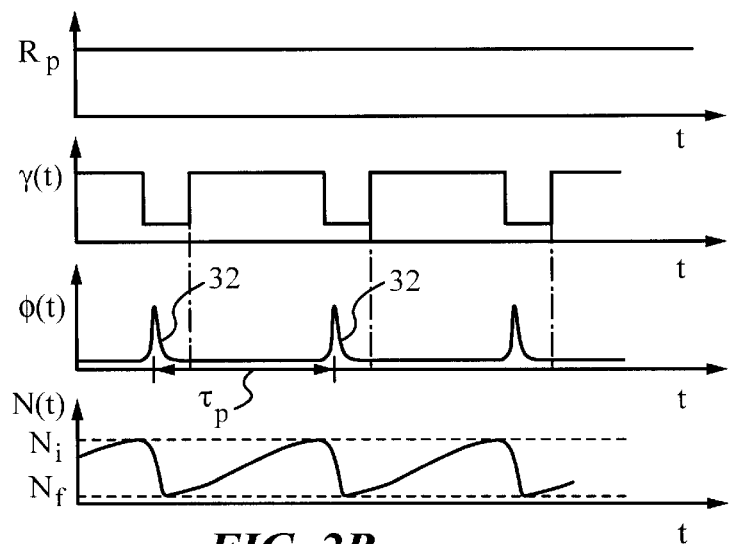
FIG. 2B (Prior art) is a timing diagram illustrating the operation of Q-switched laser of FIG. 1 under continuous pumping.

As pumping proceeds, Q-switch control 54 keeps Q-switch 52 turned on to maximize loss $\gamma(t)$ in cavity 56. As a result, the population of atoms 63A grows and approaches its saturation value of $\tau \cdot R_p$. When sufficient build-up is achieved and an initial population $N_i$ of atoms 63A exists in lasing medium 62, Q-switch control 54 turns Q-switch 52 off. Now, as better illustrated in the timing diagram of FIG. 4, loss $\gamma(t)$ in cavity 56 plummets to a low value. Although this change in loss $\gamma(t)$ is indicated as an instantaneous change, it actually takes a finite amount of time which is chosen to be shorter than the laser build-up time (see FIG. 2A). This low value is much below gain g(t) of cavity 56. Hence, light 72 at the fundamental frequency $\omega_f$ corresponding to the transition of atoms 63A begins to build-up in cavity 56.

As light 72 passes through frequency conversion element 68 second harmonic generation takes place to produce light 74 at second harmonic frequency $\omega_{2f}$ of the fundamental frequency $\omega_f$. Cavity 56 now contains light at both frequencies $\omega_f$ and $\omega_{2f}$.

When used, frequency conversion element 70 takes advantage of the second harmonic frequency to generate a third harmonic frequency. Of course, frequency conversion element 70 can also use both the fundamental and second harmonic frequencies to perform difference frequency generation or sum frequency generation. Alternatively, element 70 can be used for a parametric amplification or generation process, as understood by those skilled in the art.

Light 72 at the fundamental frequency $\omega_f$ is generally resonant within cavity 56, and very little is emitted from cavity 56 in the form of primary pulse 76. Still, some of the power of light 72 at the fundamental frequency $\omega_f$ in primary pulse 76 is consumed by either losses or output coupling either through output coupler 60 or mirror 58. Consequently, primary pulse 76 at fundamental frequency $\omega_f$ is larger inside cavity 56, but far smaller outside cavity 56. In contrast, virtually all light 74 is out-coupled from cavity 56 through output coupler 60 in the form of a secondary pulse 78. It should be noted that the nonlinear frequency conversion process responsible for generating second harmonic frequency $\omega_{2f}$ converts a certain fraction of light 72 to light 74 which is non-resonant in cavity 56 and is thus emitted or out-coupled from cavity 56.

Figure 4:
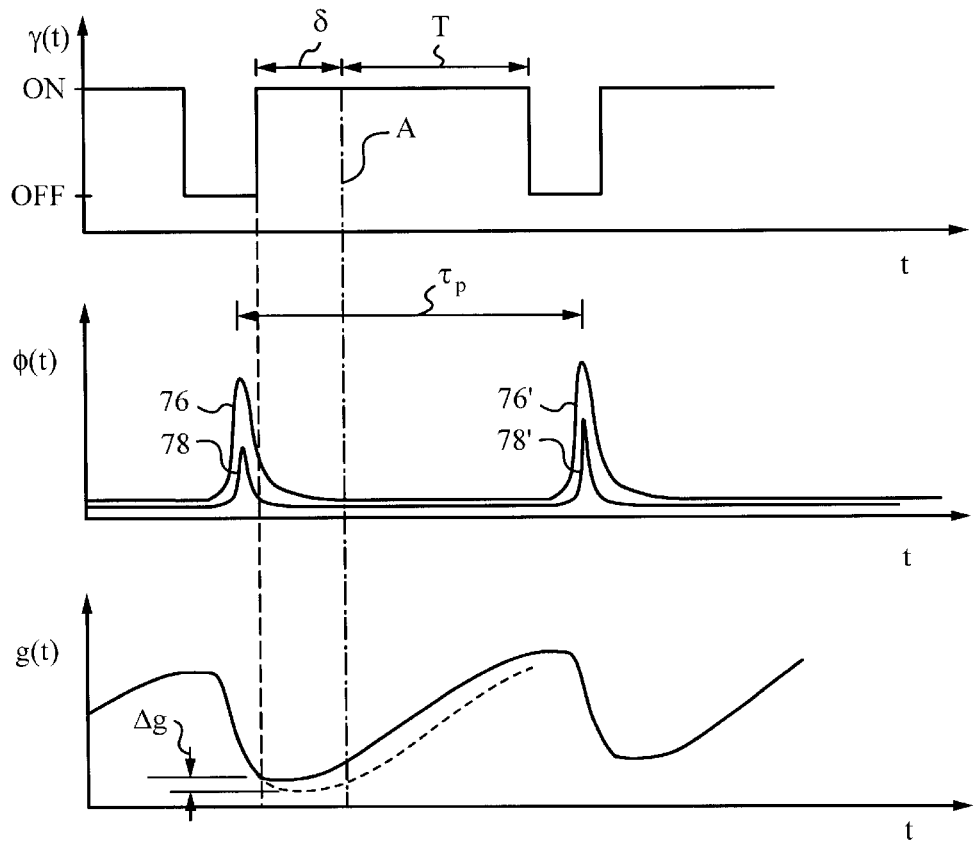
FIG. 4 is a timing diagram illustrating the principles for timing the turning on and turning off of the Q-switch of Q-switched laser of FIG. 3.

Primary and secondary pulses 76, 78 leave cavity 56 while gain g(t) in cavity 56 is being depleted and falls below the lasing threshold. Now, in contrast to the prior art, Q-switch control 54 turns Q-switch 52 back on before gain g(t) is fully depleted. In fact, Q-switch control 54 turns Q-switch 52 on again such that a certain amount of energy of primary pulse 76 is not lost or out-coupled from laser 50. As seen in FIG. 4, Q-switch 52 is turned on such that a tail portion of pulse 76 is clipped and the corresponding energy retained in laser 50. For comparison, the regular time when Q-switch 52 would be turned back on according to the prior art is indicated in dashed and dotted line A. At this time, primary and secondary pulses 76, 78 would have been essentially gone from laser 50 and gain g(t) would be close to or at its lowest value. Furthermore, time duration Q-switch 52 would be on before being turned off to generate subsequent primary and secondary pulses 76', 78' would be T.

According to the method of the invention, Q-switch 52 is already turned on for a time interval $\delta$ before time duration T. Time interval $\delta$ is chosen such that a certain amount of energy, preferably corresponding to at least 1% of primary pulse 76 and even more than 10% of primary pulse 76 is clipped or retained in laser 50. Time interval $\delta$ is also selected such that turning on of Q-switch 52 occurs after a majority of secondary pulse 78 is out-coupled from laser 50. This majority is preferably selected or adjusted such that laser 50 retains a certain pulse-to-pulse stability in the train of secondary pulses 78, 78', 78" etc. In other words subsequent secondary pulse 78' following secondary pulse 78 being out-coupled should exhibit substantially the same parameters as secondary pulse 78. Various parameters can be monitored and used for maintaining pulse-to-pulse stability. For example, peak power or energy of secondary pulses 78, 78' can be monitored to determine whether pulse-to-pulse stability is being lost. Thus, while primary pulse 76 is clipped to retain some of its energy in laser cavity 56, the clipping of secondary pulse 78 is to be avoided to ensure pulse-to-pulse stability. This choice of Q-switch 52 turn on time ensures that laser 50 retains some undepleted gain g(t) while delivering an unclipped secondary pulse 78 at $\omega_{2f}$.

Minimizing the time Q-switch 52 is off by turning it on while there is still undepleted gain g(t) has the advantage of substantially increasing the power of subsequent secondary pulse 78'. That is because an undepleted amount of gain $\Delta g$ is preserved for generating subsequent primary pulse 76' and, by frequency conversion, subsequent secondary pulse 78'. As the time duration T becomes smaller than $1/\tau$ this added gain becomes approximately proportional to $\delta/T$. The added gain translates into an increase in power of subsequent secondary pulse 78'. That is because an increase in power of subsequent primary pulse 76' will produce an increase in converted power within frequency conversion element 68 and hence higher power in subsequent secondary pulse 78'.

The method of the invention is particularly useful as interpulse time $\tau_p$ becomes short (at high pulse repetition rates) or at higher pulse frequencies. Specifically, Q-switched laser 50 is well-suited for use at pulse repetition rates larger than $1/\tau$, i.e., $\tau_p$ smaller than $1/\tau$, and becomes even more effective at pulse repetition rates much larger than $1/\tau$. At such high frequencies the increase in converted power increases faster than linearly with $\delta/\tau_p$. Thus, a few percent of undepleted gain $\Delta g$ translate into large increases in power of secondary pulses 78'. Significant increase in output power in secondary pulses 78' can be observed with, but not only with, for example, Nd:YAG lasers at frequencies of 10 kHz and even more significant increases occur at 30 kHz and higher.

In a specific embodiment second frequency mixing element 70 (indicated in dashed line in FIG. 3) is present in cavity 56 for additionally generating a third harmonic of the fundamental frequency $\omega_f$ for output as secondary pulse 78. In this embodiment laser 50 is a Nd:YAG laser. When laser 50 is operated at under 10 kHz pulse repetition rates turning Q-switch 52 back on while measurable gain g(t) still exists does not yield appreciable power increase in secondary pulses 78, 78'. That is because for a Nd:YAG laser $1/\tau$ is about 4 kHz. However, decreasing the time Q-switch 52 is off from 7.5 to 4 microseconds at 30 kHz operation increases the power of third harmonic (UV wavelength) secondary pulses 78, 78' by about 30%. At 100 kHz the same change increases the power by about 100%. Additionally, performing nonlinear operations intracavity increases the output stability of laser 50 at high repetition rates and enhances the positive effects of the method of the invention.

In another embodiment of the method, the calculation for when to turn Q-switch 52 back on is based on interpulse time $\tau_p$. Specifically, Q-switch 52 is turned on for almost the entire duration of interpulse time $\tau_p$. In other words, a minimum of interpulse time $\tau_p$ is allowed to pass with Q-switch 52 turned off. Preferably, Q-switch 52 should be turned on for more than 95% of interpulse time $\tau_p$. In practice, it may not be advantageous to optimize Q-switch control 54 settings to turn Q-switch 52 back on in much under 1% of interpulse time $\tau_p$. That is because the amount of energy saved may not be sufficient to risk clipping secondary pulses 78, 78'.

A person skilled in the art will recognize that the setting of Q-switch control 54 will involve some adaptation and optimization in each case. The above embodiments of the method provide the appropriate metrics or guidelines for setting Q-switch control 54 to direct the turning on and off of Q-switch 52. Once the settings are determined they can be stored or otherwise imparted to Q-switch control 54, as will be appreciated by those skilled in the art.

Figure 5:
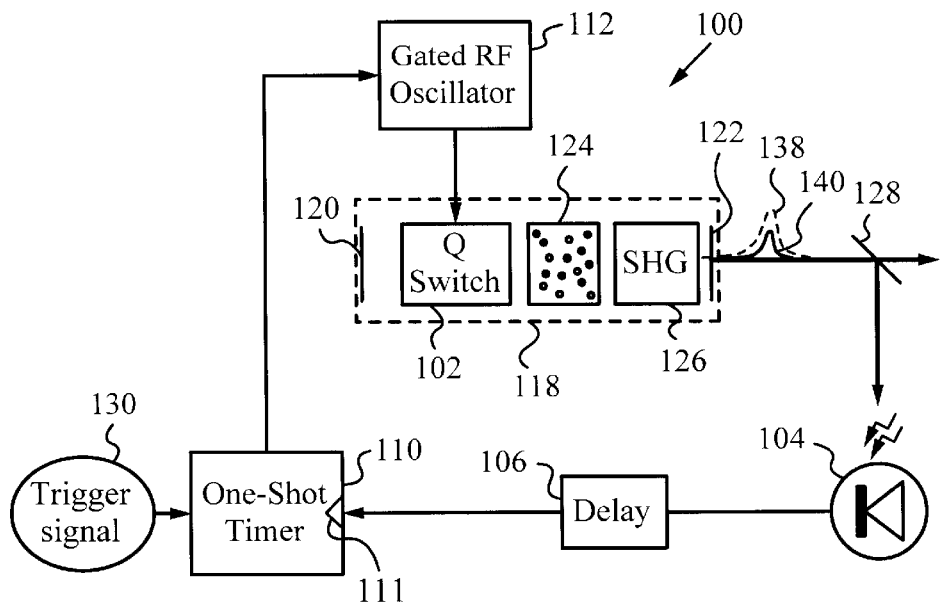
FIG. 5 is a schematic of a closed-loop embodiment of a Q-switched laser according to the invention.

A preferred embodiment of a frequency doubled, Q-switched laser 100 with a Q-switch 102 controlled in a closed-loop mode is shown in FIG. 5. Q-switch 102 is an acousto-optic Q-switch and is turned on by applying to it an appropriate RF signal, as understood by those skilled in the art. The control loop of laser 100 has a monitoring unit for measuring the power of output pulses, in this case a photomonitor 104. In addition, a delay element 106 is connected to photomonitor 104 for introducing a response delay in the control loop. Delay element 106 is connected to a "clear" input 111 of a one-shot timer 110. One-shot timer 110 is either a digital or an analog device and actuating its "clear" input 111 resets it. One-shot timer 110, in turn, is connected to a gated RF oscillator 112 which delivers an RF signal to Q-switch 102.

Laser 100 has a cavity 118 defined by mirrors 120, 122. In addition to Q-switch 102, cavity 118 contains a lasing medium 124 and a second harmonic generator 126. The pumping arrangement is not shown in this figure. The output signals from cavity 118 are out-coupled through mirror 122 and a portion of them is deflected as feedback to photomonitor 104 with the aid of a beam splitter 128.

Figure 6:
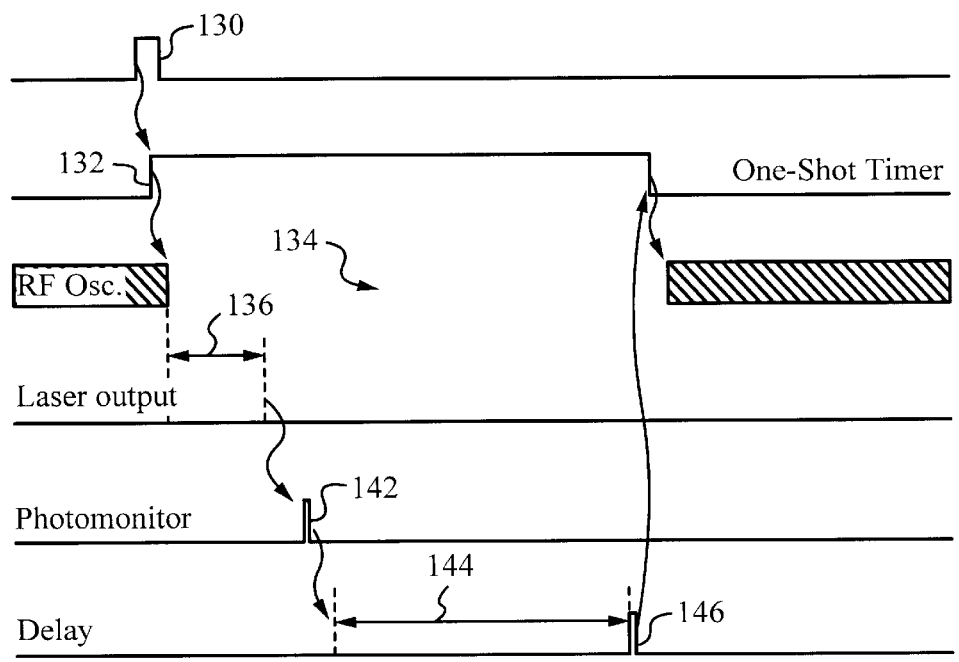
FIG. 6 is a timing diagram illustrating the operation of Q-switched laser of FIG. 5.

The operation of laser 100 will be appreciated by referring to FIG. 5 and to the timing diagram of FIG. 6. As in the previous embodiment, lasing medium 124 is pumped to obtain the desired upper state population $N_i$. Periodically, a trigger signal 130, e.g., from a device controlling laser 100, is sent to one-shot timer 110. One-shot timer 110 responds by sending a control signal 132 to gated RF oscillator 112. Control signal 132 causes oscillator 112 to interrupt its transmission of the RF signal to Q-switch 102. This opens an RF window 134 during which Q-switch 102 is turned off.

With Q-switch 102 off laser 100 starts building up over a build-up time 136. At the end of build-up time 136 a primary (intracavity) pulse 138 is generated at the fundamental frequency. The primary pulse 138 produces a secondary (output-coupled) pulse 140 at second harmonic frequency by nonlinear conversion in second harmonic generator 126. Light, particularly from pulse 140, indicated in the solid line, passes out of the cavity because of the output coupler 122, and is split by beam splitter 128. Meanwhile, only a small amount of primary pulse 138, indicated in dashed line, manages to exit cavity 118 through output coupler 122.

A photo-induced signal 142 is produced by photomonitor 104 once photomonitor 104 starts registering light from secondary pulse 140 deflected by beam splitter 128. It will be apparent to the person skilled in the art that photomonitor 104 can be set to register light of one or both pulses 138, 140 to appropriately time the turning on of Q-switch 102 according to the invention.

Photo-induced signal 142 is held in delay 106 for a delay time 144. Delay time 144 is preset, e.g., during a preliminary run or calibration of laser 100, to ensure proper turn-on timing of Q-switch 102 according to the invention. After delay time 144 expires delay 106 sends a reset signal 146 to "clear" input 111 of one-shot clear 110. In response, one-shot timer 110 terminates control signal 132 and is now ready to receive a subsequent trigger signal 130' (not shown) at a future time. Once control signal 132 is off the RF window 132 closes and RF oscillator 112 once again delivers its RF signal to Q-switch 102. Thus, Q-switch 102 is turned back on and lasing medium 124 is again pumped while laser emission is inhibited by high cavity losses.

Trigger signal 130 is repetitive and thus determines the operating frequency of laser 110 or the interpulse time $\tau_p$. The closed-loop control of laser 100 may require adjustment, e.g., the delay 106 may require resetting if the operating frequency changes significantly. In any case, the above-described method will serve as a prescription for making the appropriate timing adjustments to the control loop.

Figure 7:
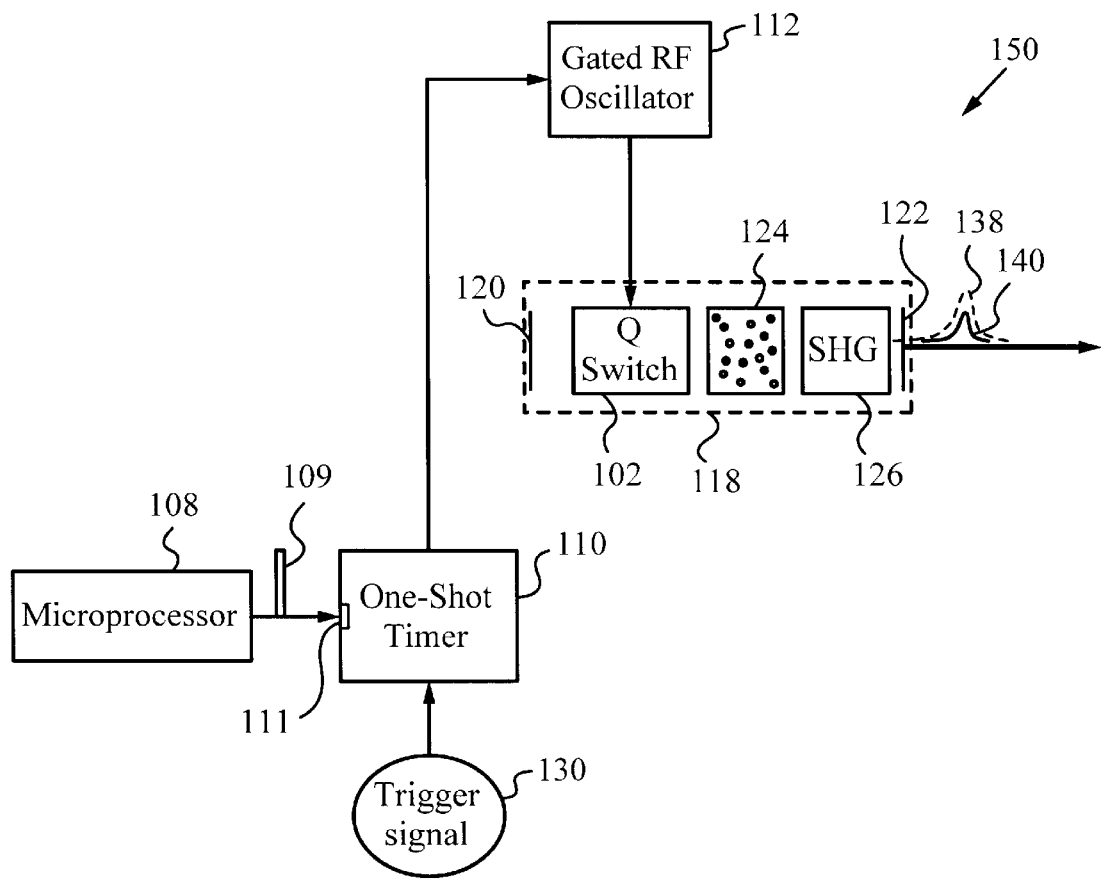
FIG. 7 is a schematic of an open-loop embodiment of a Q-switched laser according to the invention.

Another embodiment of a frequency doubled, Q-switched laser 150 with Q-switch 102 controlled in an open-loop mode is shown in FIG. 7. Corresponding parts of laser 150 shown in FIG. 5 have been labeled with the same reference numbers. Laser 150 provides no feedback of out-coupled primary and secondary pulses 138, 140 to control Q-switch 102. Instead, laser 150 has a microprocessor 108 connected to control the off time of one-shot timer 110 via signal 109.

During testing and calibration, microprocessor 108 is programmed to use an appropriate off time of one-shot 110 through an analog or digital input 111. Specifically, off times are determined in accordance with the method of invention, as discussed above, and programmed into microprocessor 108. The use of microprocessor 108 allows one to further fine-tune the delays as a function of the frequency of trigger signals 130. The operation of laser 150 is otherwise similar to that of laser 100.

A person skilled in the art will recognize that the method of the invention and Q-switched lasers according to the invention admit a multitude of alternative embodiments and adaptations. In particular, any type of Q-switching technique and elements capable of achieving the timing prescribed by the method of invention can be employed in a Q-switched laser of the invention. Accordingly, the scope of the invention should be determined by the following claims and their legal equivalents.

What is claimed:

1. A method of operating a laser having a Q-switch and performing intracavity frequency conversion comprising:
    a) providing an intracavity frequency conversion element for converting a fundamental frequency of said laser to a converted frequency;
    b) turning off said Q-switch to commence depletion of a gain built-up in said laser thereby generating a primary pulse at said fundamental frequency and a secondary pulse at said converted frequency; and
    c) turning on said Q-switch before depletion of said gain is completed, such that a predetermined amount of said gain is retained in said laser; wherein turning on said Q-switch clips a tail portion of said primary pulse such that a predetermined amount of energy of said primary pulse corresponding to at least 1% is retained in said laser.

2. The method of claim 1, wherein said Q-switch is turned on after a majority of said secondary pulse is out-coupled from said laser.

3. The method of claim 1, wherein said Q-switched laser is operated at a pulse repetition rate larger than 1/t, where t is an upper state lifetime of said laser.

4. The method of claim 3, wherein said pulse repetition rate is higher than 10 kHz.

5. The method of claim 1, wherein said frequency conversion element is a nonlinear optical material for performing a frequency mixing operation selected from the group consisting of second harmonic generation, difference frequency generation, sum frequency generation, third harmonic generation, fourth harmonic generation, parametric amplification and parametric generation.

6. The method of claim 1, further comprising the step of pumping said laser by a method selected from the group consisting of continuous pumping and nearly-continuous pumping.

7. A method of operating a laser having a Q-switch and performing intracavity frequency conversion comprising:
    a) providing an intracavity frequency conversion element for converting a fundamental frequency of said laser to a converted frequency;
    b) turning off said Q-switch to commence depletion of a gain built-up in said laser to generate a primary pulse at said fundamental frequency and a secondary pulse at said converted frequency; and
    c) turning on said Q-switch when a majority of said secondary pulse is out-coupled from said laser and a predetermined amount of energy of said primary pulse is retained in said laser.

8. The method of claim 7, wherein said predetermined amount of energy of said primary pulse comprises at least 1%.

9. The method of claim 7, wherein said Q-switched laser is operated at a pulse repetition rate larger than 1/t, where t is an upper state lifetime of said laser.

10. The method of claim 9, wherein said pulse repetition rate is higher than 10 kHz.

11. The method of claim 7, wherein said frequency conversion element is a nonlinear optical material for performing a frequency mixing operation selected from the group consisting of second harmonic generation, third harmonic generation, fourth harmonic generation, difference frequency generation, sum frequency generation, parametric amplification and parametric generation.

12. The method of claim 7, further comprising the step of pumping said laser by a method selected from the group consisting of continuous pumping and nearly-continuous pumping.

13. A method of operating a laser having a Q-switch and performing intracavity frequency conversion comprising:
    a) providing an intracavity frequency conversion element for converting a fundamental frequency of said laser to a converted frequency;
    b) repetitively turning off said Q-switch to generate a train of primary pulses at said fundamental frequency and secondary pulses at said converted frequency, said train having an interpulse time tp;
    c) turning on said Q-switch after a majority of energy of each of said secondary pulses is out-coupled from said laser and such that said Q-switch is on for a majority of said interpulse time tp.

14. The method of claim 13, wherein said majority of said interpulse time comprises more than 95% of said interpulse time tp.

15. The method of claim 14, wherein said Q-switch is turned on such that a predetermined amount of energy of each of said primary pulses is retained in said laser.

16. The method of claim 15, wherein said predetermined amount of energy comprises at least 1%.

17. The method of claim 13, wherein said repetitive turning off is performed at a repetition rate larger than 1/t, where t is an upper state lifetime of said laser.

18. The method of claim 17, wherein said pulse repetition rate is higher than 10 kHz.

19. The method of claim 13, wherein said frequency conversion element is a nonlinear optical material for performing a frequency mixing operation selected from the group consisting of second harmonic generation, third harmonic generation, fourth harmonic generation, difference frequency generation, sum frequency generation, parametric amplification and parametric generation.

20. The method of claim 13, further comprising the step of pumping said laser by a method selected from the group consisting of continuous pumping and nearly-continuous pumping.

21. The method of claim 1, wherein said Q-switch is turned on after said gain falls below a lasing threshold of said laser.

22. The method of claim 1, wherein said predetermined amount of energy is determined by detecting said primary pulse with a photomonitor.

* * * * *